| (12) | United States Patent | (10) Patent No.: | US 10,151,395 B2 |
|---|---|---|---|
| | McMichael | (45) Date of Patent: | Dec. 11, 2018 |

(54) FLEXIBLE CONCRETE HOSE SHUT-OFF VALVE

(71) Applicant: Construction Forms, Inc., Port Washington, WI (US)

(72) Inventor: Brett McMichael, Germantown, WI (US)

(73) Assignee: Construction Forms, Inc., Port Washington, WI (US)

( * ) Notice: Subject to any disclaimer, the term of this patent is extended or adjusted under 35 U.S.C. 154(b) by 0 days.

(21) Appl. No.: 15/704,164

(22) Filed: Sep. 14, 2017

(65) Prior Publication Data

US 2018/0100591 A1    Apr. 12, 2018

Related U.S. Application Data

(60) Provisional application No. 62/406,040, filed on Oct. 10, 2016.

(51) Int. Cl.
    *F16K 15/20*      (2006.01)
    *F16K 7/07*      (2006.01)
    *E04G 21/04*      (2006.01)

(52) U.S. Cl.
CPC ............ *F16K 7/07* (2013.01); *E04G 21/0418* (2013.01); *F16K 7/075* (2013.01); *E04G 2021/049* (2013.01); *Y10T 137/3631* (2015.04)

(58) Field of Classification Search
CPC ..... F16K 7/07; F16K 7/075; E04G 2021/049; E04G 21/0418
USPC ...................................... 137/225, 226; 251/5
See application file for complete search history.

(56) References Cited

U.S. PATENT DOCUMENTS

| 2,467,150 | A | * | 4/1949 | Nordell | ................... | F16K 7/075 |
| | | | | | | 137/487 |
| 2,573,712 | A | * | 11/1951 | Kallam | ................... | A01G 25/16 |
| | | | | | | 251/12 |
| 2,898,078 | A | * | 8/1959 | Stephenson | ............... | F16K 7/07 |
| | | | | | | 251/5 |

(Continued)

FOREIGN PATENT DOCUMENTS

| JP | S56157257 U | 11/1981 |
| WO | 2005/092527 A1 | 10/2005 |

OTHER PUBLICATIONS

International Search Report and Written Opinion for International Application No. PCT/US2017/051463 dated Nov. 17, 2017.

*Primary Examiner* — Umashankar Venkatesan

(74) *Attorney, Agent, or Firm* — Andrus Intellectual Property Law, LLP

(57) ABSTRACT

A concrete flow leakage-preventing shut-off valve includes an outer flexible casing configured to be disposed around a concrete delivery hose. A flexible inflatable bladder is disposed within the casing and defines a gas chamber therein. A gas intake/exhaust device extends through the casing and into the gas chamber such that pressurized gas introduced and exhausted from the gas chamber enables movement of the bladder to define closed and open concrete flow conditions of concrete relative to an outlet end of the hose. A clamping arrangement secures opposite ends of the casing and the bladder in radially and axially spaced apart relationship, and is configured to maintain a surrounding relationship of the casing and bladder with respect to the hose.

20 Claims, 8 Drawing Sheets

(56) References Cited

U.S. PATENT DOCUMENTS

| | | | | |
|---|---|---|---|---|
| 2,972,464 | A | * | 2/1961 | Jones .................. F16K 7/07 251/5 |
| 2,982,511 | A | * | 5/1961 | Connor ................ F16K 7/07 251/5 |
| 3,643,912 | A | * | 2/1972 | Livingston .......... A62C 35/605 251/5 |
| 6,871,832 | B2 | | 3/2005 | Lehnhardt et al. |
| 6,968,861 | B2 | | 11/2005 | Judge et al. |
| 2004/0004092 | A1 | | 1/2004 | Judge et al. |
| 2007/0131251 | A1 | * | 6/2007 | Murthum ............ B08B 9/055 134/22.1 |

* cited by examiner

FLEXIBLE CONCRETE HOSE SHUT-OFF VALVE

CROSS-REFERENCE TO RELATED APPLICATION

The present utility application relates to and claims priority to U.S. Provisional Patent Application Ser. No. 62/406,040, filed Oct. 10, 2016, the disclosure of which is incorporated herein by reference in entirety.

FIELD

The present invention relates to shut-off valves and, more particularly, to an inline valve to control the flow of concrete in a concrete delivery system.

BACKGROUND

Concrete is typically delivered at a job site to remote areas via a pump that pumps the concrete through a series of boom-connected pipes terminating in a flexible delivery hose. The flow of concrete is typically controlled at a point remote from the delivery hose and thus even when the concrete flow is stopped at its source, it is not unusual for concrete to continue to flow or drip from the end of the delivery hose. This condition can be very undesirable at certain job sites.

A number of devices have been created to prevent the residual flow of concrete out the delivery hose. One such device is described in U.S. Pat. No. 6,871,832 by Lehnhardt, et al., as a flexible cylindrical sleeve disposed within a one-piece rigid casing that surrounds the delivery hose. When pressurized gas is forced into the space between the sleeve and casing, the sleeve then expands and constricts the hose to prevent the flow of concrete. In practice, the rigid casing is made from a long, rigid fiberglass tube with steel sealing caps on either side which adds significant weight to the device.

Another device is described in U.S. Pat. No. 6,968,861 by Judge as a substantially sealed flexible bladder in a casing where material flow through the discharge hose is prevented by introducing compressed air into the flexible bladder, causing the bladder to expand and constrict the discharge hose. In practice the casing is made from heavy stainless steel which causes the device to have significant weight.

In many cases, the flexible delivery hose is the last section on a truck-mounted articulating arm with the delivery pipes connected to the arms of the boom. With some of these boom trucks being able to deliver concrete to over 200 feet away from the truck, the combined weight of the arms, pipe and concrete can cause stability concerns. Because of this, boom truck manufacturers have strict weight limits on what equipment can be mounted to the pipes. The last section, where the flexible delivery hose is connected, is furthest out and has the greatest influence on stability and therefore the greatest restriction on the amount of weight that can be added to it. Unfortunately, this last section is where the relatively heavy flow control devices are added to the boom truck which lowers their stability safety factor.

SUMMARY

The present invention seeks to reduce the weight of the concrete shut-off valve which increases the stability safety factor of a pump truck it is mounted on as well as eases the installation onto the flexible delivery hose. The reduction in weight is accomplished by replacing the relatively high weight rigid casings of past designs with a low weight, flexible material. In the preferred embodiment of the present invention, a flexible fabric is used, examples of which include, but are not limited to, polyester, nylon, para-aramid synthetic fiber, carbon fiber, etc. The fabric is of sufficient size and strength to contain a flexible, inflatable bladder that when inflated restricts the flow of concrete.

Direct contact of concrete can adversely affect the strength and longevity of certain high strength fabrics due to its caustic nature. Exposure to UV light from the sun and ozone from the atmosphere can also have adverse effects. To prevent premature degradation of the flexible casing due to the operational environment in which it is exposed to the aforementioned hazards, an alternate embodiment of the present invention utilizes multiple layers of different fabric for the flexible shell. In the preferred embodiment, the exterior of the shell is constructed from environmentally resistant nylon which is sewn to a high strength but more environmentally susceptible polyester interior. In this fashion, the exterior is in direct exposure to the adverse operational environment while the interior is shielded on both sides with the exterior layer on one side and the flexible bladder on the other. Additionally, a single layer fabric could be coated with a flexible protective material such as PVC to make it resistant to the operating environment.

Another feature of the present invention is in its assembly. Clamping bars are used to seal the flexible bladder by pinching off each end while simultaneously mechanically linking the flexible casing with a bridge bar. In the preferred embodiment, this is accomplished by using a bridge bar with fastener holes on either side that mate to clamping bars. The fabric casing has grommets located at the same hole spacing as the bridge bar and the flexible bladder has holes at the same hole spacing as well. Assembly entails simply mechanically fastening the components together by passing bolts through the clamping bars, then through the flexible bladder, then through the bridge bar, and finally through the grommets in the fabric casing and then capped with washers and nuts. It should be noted that alternate methods can be used to clamp the flexible bladder such that only one clamping bar is used to seal both ends of the flexible bladder and is connected to the bridge bar via fasteners down the middle of the bridge bar.

Additionally, the clamping and bridge bars can have novel features to facilitate the sealing of the flexible bladder. In one embodiment, the bridge bar has a bend to better match the shape of the circular hose that passes through the valve. Another embodiment has the clamping surfaces of the clamping and bridge bars formed with a rough surface texture to facilitate the gripping of the flexible bladder. Yet another embodiment has the clamping surfaces of the clamping and bridge bars formed with interlocking geometry to facilitate the gripping of the flexible bladder.

According to one aspect of the present invention, a concrete flow leakage-preventing shut-off valve is adjustably mounted on a concrete delivery hose whereby the flow of concrete is controlled between an open concrete flow condition and a closed concrete flow condition. The valve includes an outer flexible casing configured to be disposed around the concrete delivery hose. The outer flexible casing has opposite first and second casing ends lying adjacent and spaced from each other. A flexible inflatable bladder is disposed within the outer flexible casing along an inner surface thereof. The flexible bladder has opposite first and second bladder ends lying adjacent and spaced from one another and inside the opposite casing ends and defines a gas chamber therein. The concrete delivery hose passes through the outer flexible casing and the flexible bladder and isolates the concrete flow from the outer flexible casing and the flexible bladder. A gas intake/exhaust device extends through the outer flexible casing and into the gas chamber such that pressurized gas is introduced into the gas chamber causing the flexible bladder to be forced radially inward to constrict and close upon the concrete delivery hose to define the closed concrete flow condition wherein concrete flow from an outlet end of the concrete delivery hose is terminated. Pressurized gas is exhausted from the gas chamber for quickly exhausting gas delivered to the gas intake/exhaust device to define the open concrete flow condition, wherein concrete flow from the outlet end of the concrete delivery hose is permitted. A clamping arrangement secures the opposite first and second casing ends and the opposite first and second bladder ends together in radially and axially spaced apart relationship. The clamping arrangement is configured to maintain a surrounding relationship of the outer flexible casing and the flexible bladder with respect to the concrete delivery hose.

BRIEF DESCRIPTION OF THE DRAWINGS

The drawings illustrate the best mode presently contemplated of carrying out the invention.

DETAILED DESCRIPTION

Figure 1:
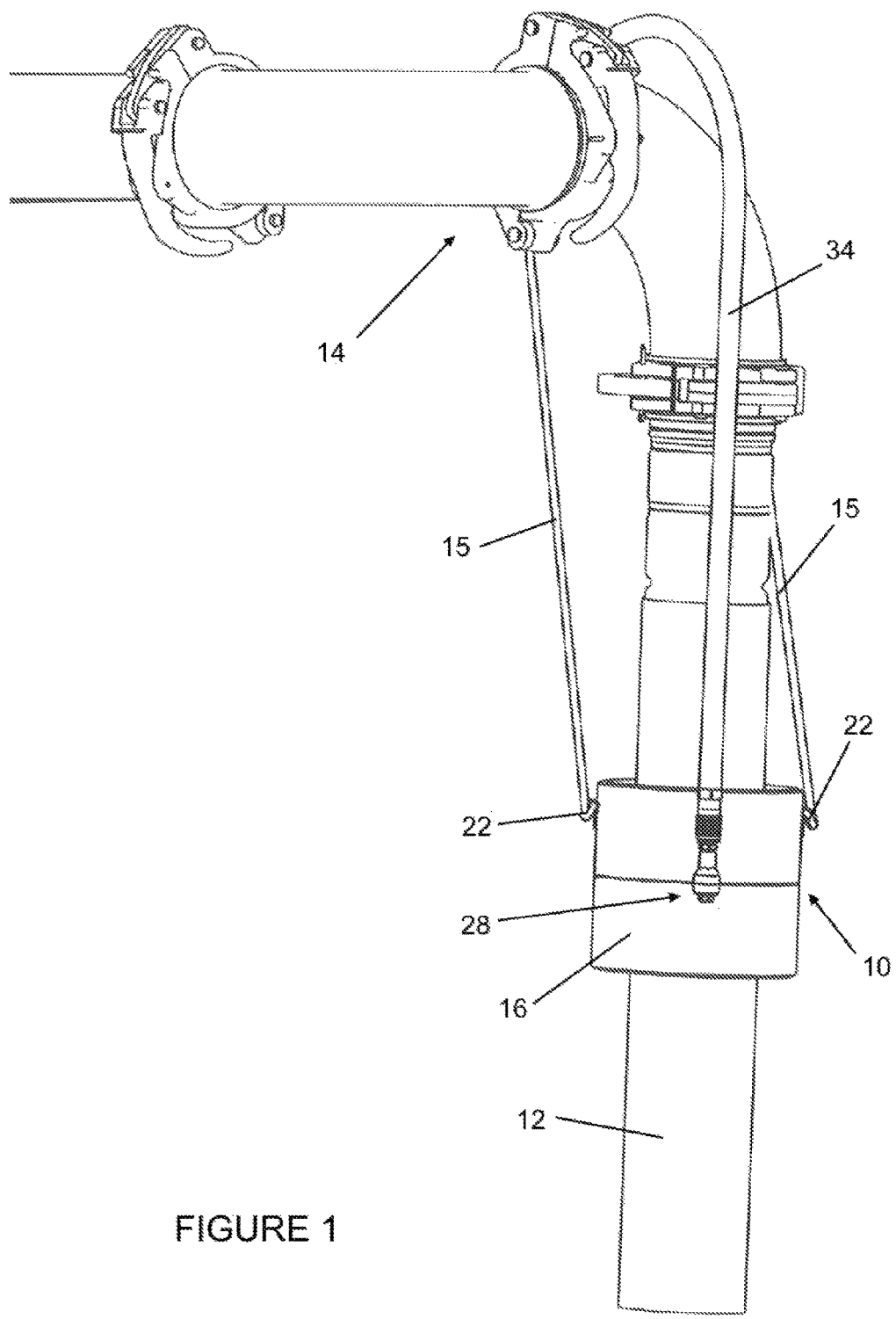
FIG. 1 is a perspective view of a shut-off valve connected to the concrete delivery hose of a concrete pumping system.
Figure 2:
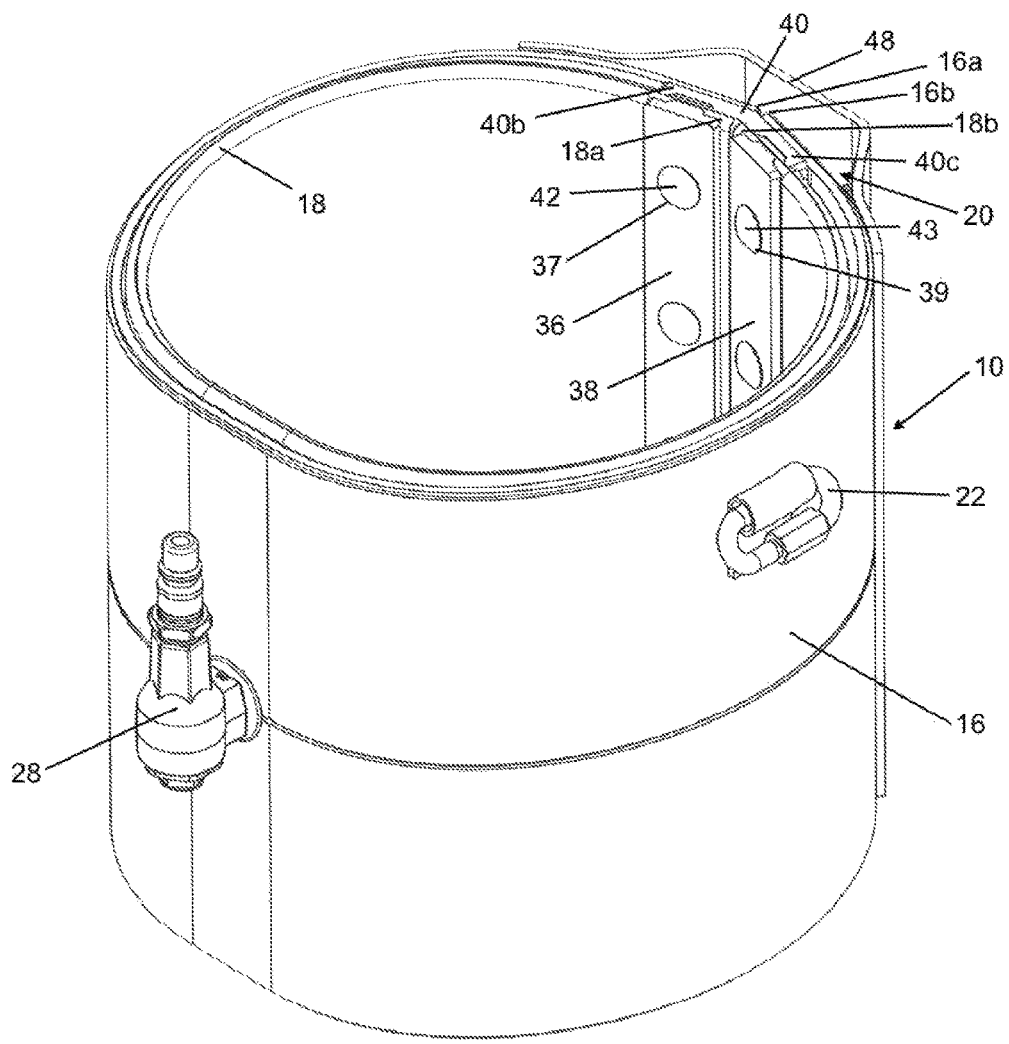
FIG. 2 is a perspective view of the shut-off valve constructed according to the present invention.
Figure 3:
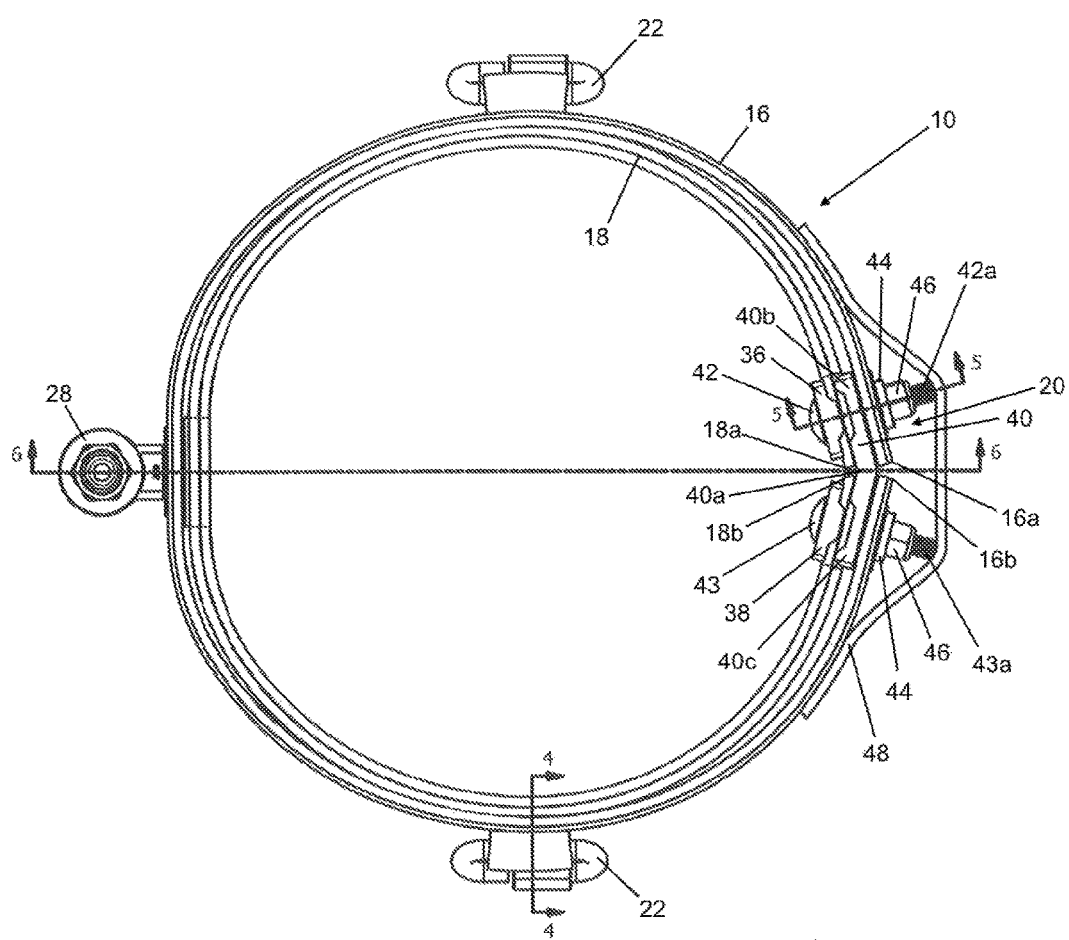
FIG. 3 is a top view of the shut-off valve shown in FIG. 2.
Figure 4:
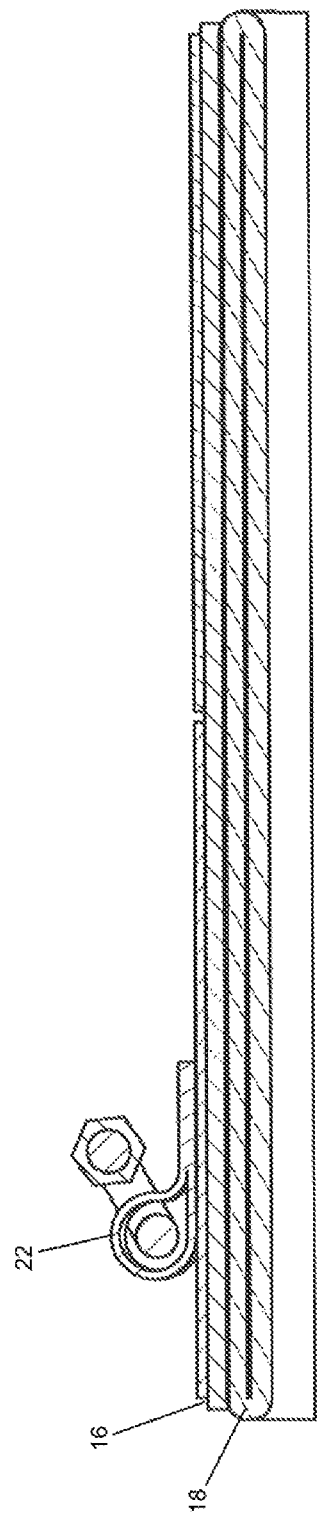
FIG. 4 is a sectional view of the shut-off valve taken on line 4-4 of FIG. 3.

Referring now to the drawings, FIG. 1 shows a concrete shut-off valve 10 which is disposed in surrounding relationship with a concrete delivery hose 12 of a concrete pumping system 14, and a is suspended therefrom by hanging straps 15. Shut-off valve 10 includes an outer flexible casing 16, a flexible inflatable bladder 18 and a clamp arrangement 20 as seen in FIG. 2.

Figure 7:
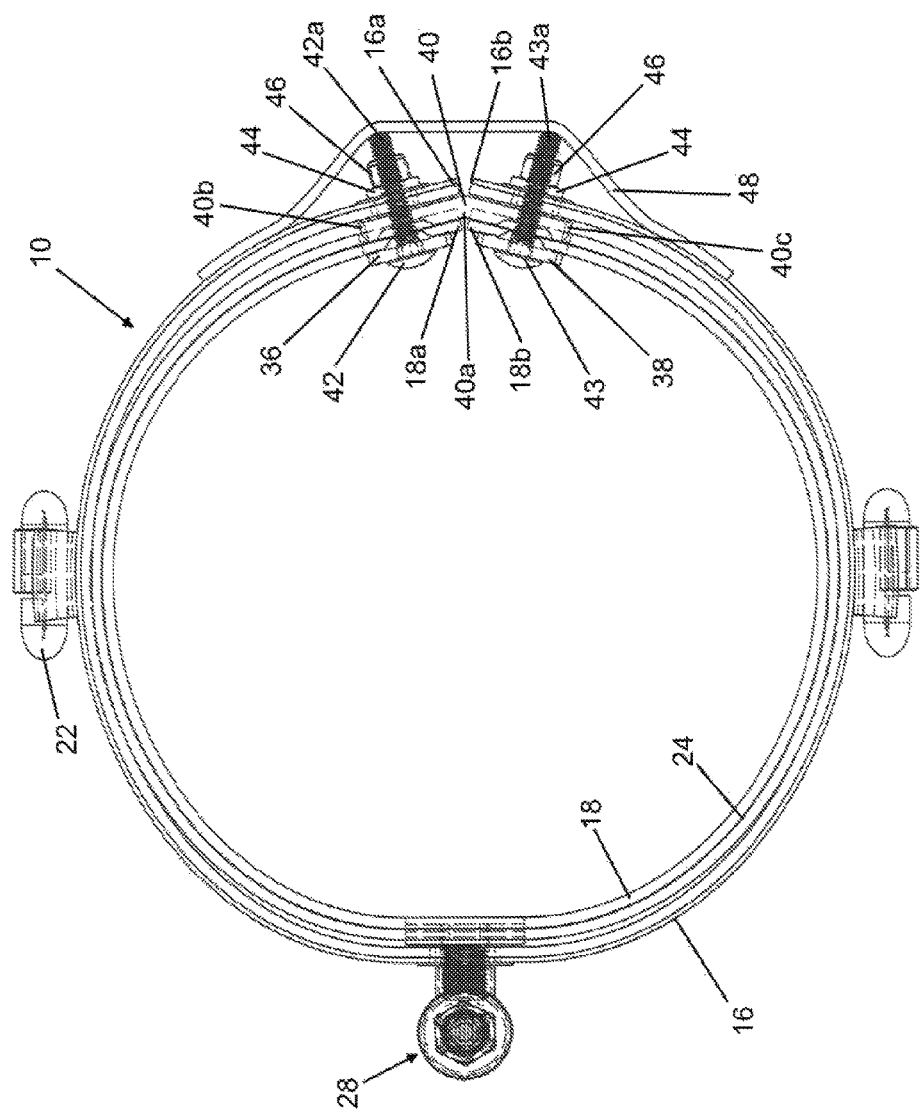
FIG. 7 is an end sectional view of the shut-off valve.

The outer casing 16 is preferably formed of a lightweight, high strength flexible fabric, examples of which include, but are not limited to, polyester, nylon, para-aramid synthetic fiber and carbon fiber. To prevent premature degradation of the flexible casing 16 due to the caustic nature of concrete to which it is exposed along with other adverse environmental exposure, it is contemplated that the flexible casing 16 is constructed of multiple layers of flexible fabric connected together. For example, in one example, an exterior layer of the flexible casing 16 is constructed of environmentally-resistant nylon which is sewn to a high strength but more environmentally susceptible interior layer of polyester. In another example, the flexible casing 16 is constructed of a single-layer fabric which can be coated with a flexible protective material, such as PVC, to make it resistant to the operating environment. In any case, the outer flexible casing 16 defines a continuous single piece construction. As best seen in FIG. 7, the flexible casing 16 has opposed closed first and second casing ends 16a, 16b which lie adjacent and in spaced relationship with one another. As seen in FIG. 1, the flexible casing 16 is configured to be disposed around and in spaced relationship from the concrete delivery hose 12. A pair of mounting brackets 22 are provided diametrically opposite each other on an exterior surface of the casing 16 and are connected to the hanging straps 15 for supporting the shut-off valve 10 from the concrete pumping system 14.

The flexible inflatable bladder 18 is disposed within the outer flexible casing 16 along an inner surface thereof, and is configured to be operably engaged with an outer surface of the concrete delivery hose 12. The flexible bladder 18 has opposite closed first and second bladder ends 18a, 18b which lie adjacent and spaced apart from one another and inside the opposite casing ends 16a, 16b. The flexible bladder 18 defines an inflatable and deflatable gas chamber 24 (FIG. 7) between the opposite ends 18a, 18b thereof.

Figure 6:
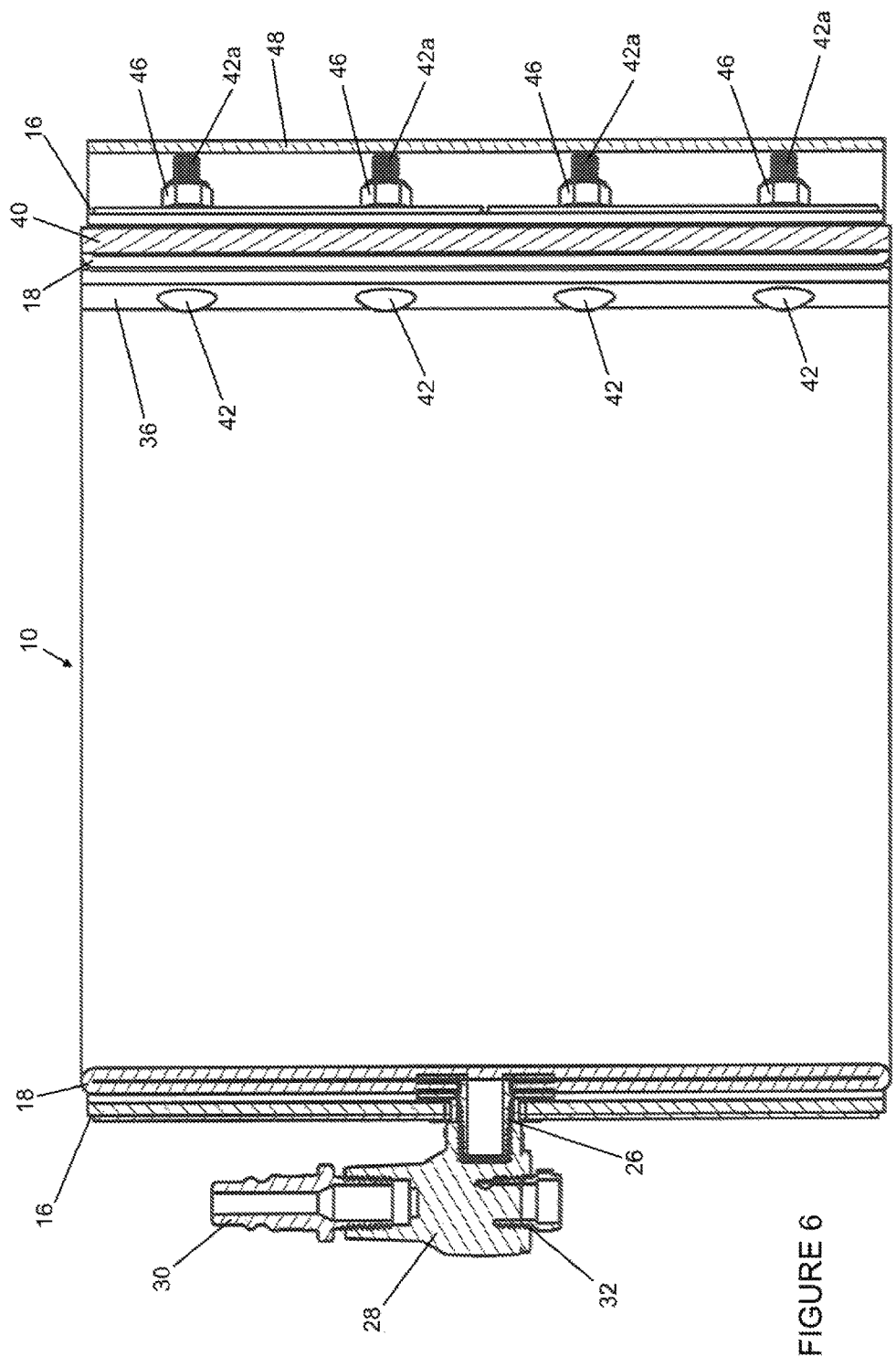
FIG. 6 is a sectional view of the shut-off valve taken on line 6-6 of FIG. 3

A gas port 26 (FIG. 6) is mounted on an exterior surface of the outer flexible casing 16, and extends through the casing 16 and into the flexible bladder 18 so that it communicates with the gas chamber 24 defined by the flexible bladder 18. A gas intake/exhaust valve 28 is disposed on the outside of gas port 26 and includes an inlet 30 and an outlet 32. As is well known, such as disclosed in U.S. Pat. No. 6,871,832 which is herein incorporated by reference in entirety, pressurized gas is delivered from a source through a gas line 34 (FIG. 1) connected to the inlet 30 of the gas intake/exhaust valve 28 which is suitably controlled as set forth in the '832 patent.

The clamping arrangement 20 is provided for securing the opposite casing ends 16a, 16b and the opposite bladder ends 18a, 18b together in radial and axial spaced apart relationship relative thereto. In the example shown, the clamping arrangement 20 includes a pair of elongated clamping bars 36, 38, an elongated bridge bar 40 and a set of bolts 42, 43, washers 44 and nuts 46.

Figure 5:
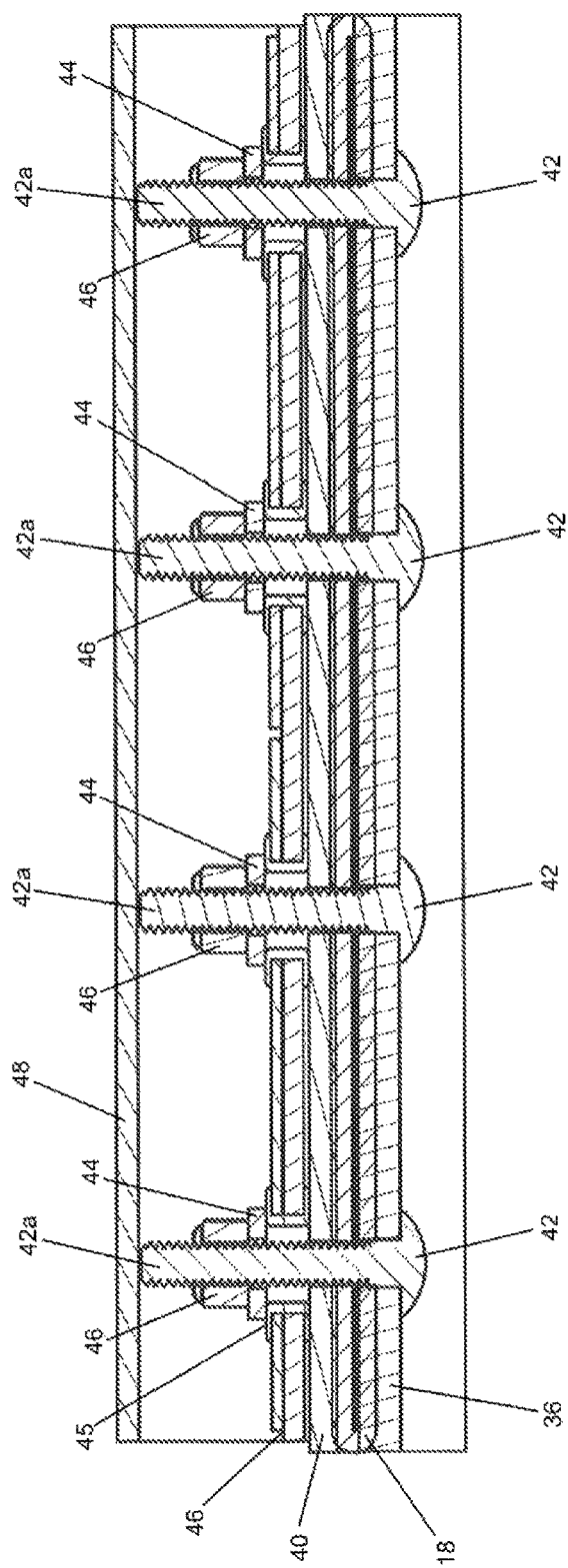
FIG. 5 is a sectional view of the shut-off valve taken on line 5-5 of FIG. 3.
Figure 8:
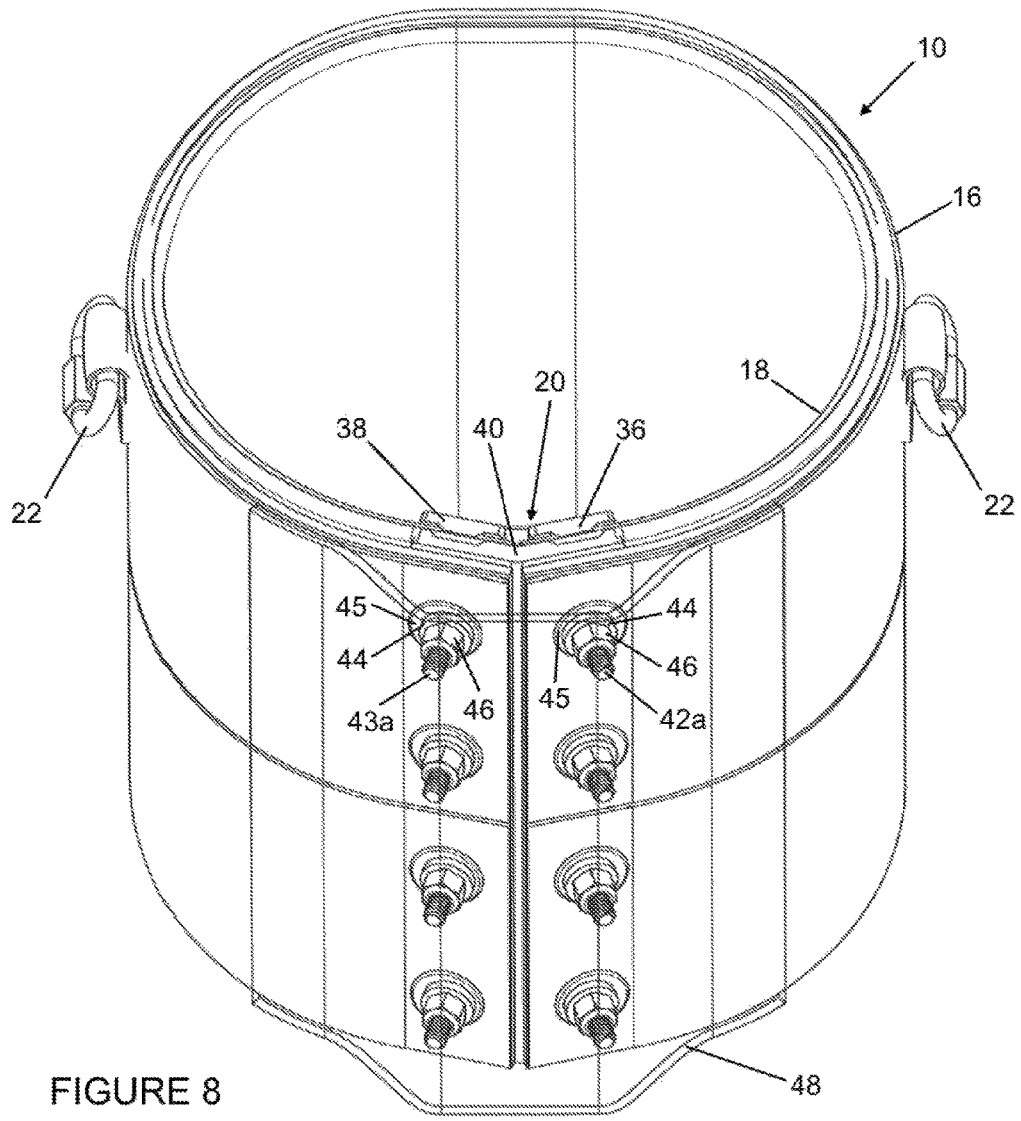
FIG. 8 is another perspective view of the shut-off valve.

As best seen in FIGS. 2 and 7, clamping bar 36 is disposed along an entire length of the bladder end 18a along an inner surface thereof, and is provided with a series of vertically spaced throughholes 37 which are aligned with cooperating holes formed through the bladder end 18a. Similarly, clamping bar 38 is disposed along an entire length of the bladder end 18b along an inner surface thereof, and is formed with a number of vertically spaced throughholes 39 which are in registration with cooperating holes formed through the bladder 18b. The bridge bar 40 is positioned between the casing ends 16a, 16b and the bladder ends 18a, 18b, and runs along the lengths thereof. The bridge bar 40 is integrally formed with a central bent portion 40a which bridges the axial spacing between the casing ends 16a, 16b and the bladder ends 18a, 18b, a first portion 40b which lies between the casing end 16a and the bladder end 18a and a second portion 40c which is disposed between the casing end 16b and the bladder end 18b. The first and second bridge portions 40b, 40c are also formed with throughholes designed to register with the throughholes 37, 39 formed in the clamping bars 36, 38, and the bladder ends 18a, 18b as well as with grommets 45 (FIGS. 5 and 8) and throughholes formed on the casing ends 16a, 16b.

Threaded shafts 42a of bolts 42 are passed through aligned throughholes 37 in the clamping bar 36, the aligned holes formed in the bladder end 18a, the bridge portion 40b and the casing end 16a, and through washers 44, and are threaded into nuts 46. Threaded shafts 43a of bolts 43 are passed through the aligned throughholes 39 in the clamping bar 38, the aligned holes formed in the bladder end 18b, the bridge portion 40c and the casing end 16b, and through washers 44 and then threaded into nuts 46. A flexible material 48 having ends which are removably attached, such as by hook and loop fasteners or the like, to the exterior surface of casing 16 can be provided to cover the protruding fastening elements 42a, 43a, 44 and 46 and protect against snagging of the valve 10 during operation. With this assembly, the longitudinal axes of the bolts 42, 43 diverge with respect to each other, and the casing ends 16a, 16b are mechanically secured to the bladder ends 18a, 18b in a radially and axially spaced apart relationship at the central portion 40a of the bridge bar 40 which is bent to better conform to the shape of the concrete delivery hose 12 passing through the shut-off valve 10.

In operation, when it is desired to close the shut-off valve 10, pressurized gas, such as air, is delivered through gas line 34 to gas intake/exhaust valve 28 into gas chamber 24 via gas port 26. Flexible bladder 18 expands radially inwardly to constrict concrete delivery hose 12 to the point where flow of concrete through the hose 12 is interrupted. At the same time, the flexible casing 16 will permit radial outward expansion of the flexible bladder 18. When it is desired to open the shut-off valve 10, delivery of gas to the gas intake/exhaust valve 28 is stopped and pressurized gas from the bladder 18 is exhausted through the outlet 32 at the bottom of the gas intake/exhaust valve 28, enabling release of closing pressure on the concrete delivery hose 12 so that the concrete may resume flow therethrough.

In the example described, it is contemplated that the clamping bars 36, 38 and the bridge bar 40 are formed of a rigid material, such as metal, which will maintain the surrounding relationship of the flexible casing 16 and the flexible bladder 18 around the concrete delivery hose 12. Clamping surfaces of the clamping bars 36, 38 and the bridge bar 40 may be formed with a rough surface texture to facilitate positive gripping of the flexible bladder 18. In addition, the clamping surfaces of clamping bars 36, 38 and the bridge bar 40 can be configured with interlocking geometry to facilitate positive gripping of the bladder 18. Alternatively, it is envisioned that a single clamping bar may be used in place of the pair of clamping bars 36, 38 in which case appropriate fasteners would pass through the center of the single clamping bar and the bridge bar 40.

The present invention thus provides a shut-off valve 10 which increases the stability safety factor of a truck while pumping concrete, and eases installation onto a flexible concrete delivery hose by reducing the weight of the shut-off valve. The reduction in weight is accomplished by replacing relatively high weight rigid casings of past designs with the low weight flexible fabric casing 16. Notwithstanding the preferred use of flexible fabric for the casing 16, it is contemplated that the casing 16 may also be constructed of a fiberglass material which also reduces the weight of the shut-off valve 10.

It is recognized that other equivalents, alternatives and modifications aside from those expressly stated are possible and within the scope of the amended claim(s).

What is claimed is:

1. A concrete flow leakage-preventing shut-off valve mounted on a concrete delivery hose, whereby a flow of concrete is controlled between an open concrete flow condition and a closed concrete flow condition, the valve comprising:
    an outer flexible fabric casing configured to be disposed around the concrete delivery hose, the outer flexible fabric casing having opposite first and second casing ends lying adjacent and spaced from each other;
    a flexible inflatable bladder disposed within the outer flexible fabric casing along an inner surface thereof, the flexible bladder defining a gas chamber therein, and having opposite first and second bladder ends lying adjacent and spaced from one another and inside the opposite first and second casing ends, the concrete delivery hose passing through the outer flexible fabric casing and the flexible bladder and isolating the concrete flow from the outer flexible casing and the flexible bladder;
    a gas intake/exhaust device extending through the outer flexible fabric casing and into the gas chamber such that pressurized gas is introduced into the gas chamber causing the flexible bladder to be forced radially inward to constrict and close upon the concrete delivery hose to define the closed concrete flow condition wherein concrete flow from an outlet end of the concrete delivery hose is terminated, and whereby pressurized gas is exhausted from the gas chamber for quickly exhausting gas delivered to the gas intake/exhaust device to define the open concrete flow condition, wherein concrete flow from the outlet end of the concrete delivery hose is permitted; and
    a clamping arrangement securing the opposite first and second casing ends and the opposite first and second bladder ends together in radially and axially spaced apart relationship relative thereto, the clamping arrangement being configured to maintain a surrounding relationship of the outer flexible fabric casing and the flexible bladder with respect to the concrete delivery hose.

2. The shut-off valve of claim 1, wherein a gas port is mounted on an exterior surface of the outer flexible fabric casing and extends through the outer flexible fabric casing and into the flexible bladder so that it is in fluid communication with the gas chamber.

3. The shut-off valve of claim 1, wherein the clamping arrangement includes a clamping bar set, an elongated bridge bar and a set of fasteners.

4. The shut-off valve of claim 3, wherein the clamping bar set includes a pair of clamping bars, and the set of fasteners includes bolts, washers and nuts.

5. The shut-off valve of claim 4, wherein a first clamping bar is disposed along a length of the first bladder ends along an inner surface thereof, and is provided with a first throughhole arrangement aligned with cooperating holes formed through the first bladder end.

6. The shut-off valve of claim 5, wherein a second clamping bar is disposed along a length of the second bladder end along an inner surface thereof, and is provided with a second throughhole arrangement aligned with cooperating holes formed through the second bladder end.

7. A concrete flow leakage-preventing shut-off valve mounted on a concrete delivery hose, whereby a flow of concrete is controlled between an open concrete flow condition and a closed concrete flow condition, the valve comprising:
    an outer flexible casing configured to be disposed around the concrete delivery hose, the outer flexible casing having opposite first and second casing ends lying adjacent and spaced from each other;
    a flexible inflatable bladder disposed within the outer flexible casing along an inner surface thereof, the flexible bladder defining a gas chamber therein, and having opposite first and second bladder ends lying adjacent and spaced from one another and inside the opposite first and second casing ends, the concrete delivery hose passing through the outer flexible casing and the flexible bladder and isolating the concrete flow from the outer flexible casing and the flexible bladder;

a gas intake/exhaust device extending through the outer flexible casing and into the gas chamber such that pressurized gas is introduced into the gas chamber causing the flexible bladder to be forced radially inward to constrict and close upon the concrete delivery hose to define the closed concrete flow condition wherein concrete flow from an outlet end of the concrete delivery hose is terminated, and whereby pressurized gas is exhausted from the gas chamber for quickly exhausting gas delivered to the gas intake/exhaust device to define the open concrete flow condition, wherein concrete flow from the outlet end of the concrete delivery hose is permitted; and a clamping arrangement securing the opposite first and second casing ends and the opposite first and second bladder ends together in radially and axially spaced apart relationship relative thereto, the clamping arrangement being configured to maintain a surrounding relationship of the outer flexible casing and the flexible bladder with respect to the concrete delivery hose;

wherein the clamping arrangement includes a clamping bar set, an elongated bridge bar and a set of fasteners;

wherein the clamping bar set includes a pair of clamping bars, and the set of fasteners includes bolts, washers, and nuts;

wherein a first clamping bar is disposed along a length of the first bladder ends along an inner surface thereof, and is provided with a first throughhole arrangement aligned with cooperating holes formed through the first bladder end;

wherein a second clamping bar is disposed along a length of the second bladder end along an inner surface thereof, and is provided with a second throughhole arrangement aligned with cooperating holes formed through the second bladder end; and wherein the bridge bar is positioned between the first and second casing ends and the first and second bladder ends, and runs along lengths thereof.

8. The shut-off valve of claim 7, wherein the bridge bar is formed with a central bent portion which bridges an axial spacing between the first and second casing ends and the first and second bladder ends.

9. The shut-off valve of claim 7, wherein the bridge bar includes a first bridge portion which lies between the first casing end and the first bladder end.

10. The shut-off valve of claim 9, wherein the bridge bar includes a second bridge portion which is disposed between the second casing end and the second bladder end.

11. The shut-off valve of claim 10, wherein the first and second bridge portions are formed with a third throughhole arrangement aligned with the first and second throughhole arrangements.

12. The shut-off valve of claim 11, wherein threaded shafts of the bolts are passed through the first and second clamping bars, the first and second bridge portions, the first and second bladder ends, the first and second casing ends, the washers and threaded into the nuts.

13. The shut-off valve of claim 12, wherein a flexible material is attached to the exterior surface of the casing to cover the fasteners protruding therefrom.

14. The shut-off valve of claim 12, wherein longitudinal axes of the bolts diverge with respect to each other as the bolts extend from the first and second clamping bars through the first and second bladder ends.

15. A concrete flow leakage-preventing shut-off valve mounted on a concrete delivery hose, whereby a flow of concrete is controlled between an open concrete flow condition and a closed concrete flow condition, the valve comprising:

an outer flexible fabric casing configured to be disposed around the concrete delivery hose, the outer flexible fabric casing having opposite first and second casing ends lying adjacent and spaced from each other;

a flexible inflatable bladder disposed within the outer flexible fabric casing along an inner surface thereof, the flexible bladder defining a gas chamber therein, and having opposite first and second bladder ends lying adjacent and spaced from one another and inside the opposite first and second casing ends, the concrete delivery hose passing through the outer flexible fabric casing and the flexible bladder and isolating the concrete flow from the outer flexible casing and the flexible bladder;

a gas intake/exhaust device extending through the outer flexible fabric casing and into the gas chamber such that pressurized gas is introduced into the gas chamber causing the flexible bladder to be forced radially inward to constrict and close upon the concrete delivery hose to define the closed concrete flow condition wherein concrete flow from an outlet end of the concrete delivery hose is terminated, and whereby pressurized gas is exhausted from the gas chamber for quickly exhausting gas delivered to the gas intake/exhaust device to define the open concrete flow condition, wherein concrete flow from the outlet end of the concrete delivery hose is permitted; and a clamping arrangement securing the opposite first and second casing ends and the opposite first and second bladder ends together in radially and axially spaced apart relationship relative thereto, the clamping arrangement being configured to maintain a surrounding relationship of the outer flexible fabric casing and the flexible bladder with respect to the concrete delivery hose; and wherein the outer flexible casing is formed of a single piece construction.

16. A concrete flow leakage-preventing shut-off valve mounted on a concrete delivery hose, whereby a flow of concrete is controlled between an open concrete flow condition and a closed concrete flow condition, the valve comprising:

an outer flexible casing configured to be disposed around the concrete delivery hose, the outer flexible casing having opposite first and second casing ends lying adjacent and spaced from each other;

a flexible inflatable bladder disposed within the outer flexible casing along an inner surface thereof, the flexible bladder defining a gas chamber therein, and having opposite first and second bladder ends lying adjacent and spaced from one another and inside the first and second casing ends, the concrete delivery hose passing through the outer flexible casing and the flexible bladder and isolating the concrete flow from the outer flexible casing and the flexible bladder;

a gas intake/exhaust device extending through the outer flexible casing and into the gas chamber such that pressurized gas is introduced into the gas chamber causing the flexible bladder to be forced radially inward to constrict and close upon the concrete delivery hose to define the closed concrete flow condition wherein concrete flow from an outlet end of the concrete delivery hose is terminated, and whereby pressurized gas is exhausted from the gas chamber for quickly exhausting gas delivered to the gas intake/exhaust device to define the open concrete flow condition, wherein concrete flow from the outlet end of the concrete delivery hose is permitted; and a clamping arrangement securing the opposite first and second casing ends and the opposite first and second bladder ends together in radially and axially spaced apart relationship relative thereto, the clamping arrangement being configured to maintain a surrounding relationship of the outer flexible casing and the flexible bladder with respect to the concrete delivery hose, wherein the clamping arrangement includes a clamping bar arrangement disposed along inner surfaces of the first and second bladder ends, a bridge bar positioned between the first and second casing ends and the first and second bladder ends, and a fastener arrangement connecting the clamping bar arrangement, the bridge bar, the first and second bladder ends and the first and second casing ends together.

17. The shut-off valve of claim 1, wherein the outer flexible fabric casing permits radial outward expansion of the flexible inflatable bladder.

18. The shut-off valve of claim 1, wherein the outer flexible fabric casing comprises one of polyester, nylon, para-aramid synthetic fiber, and carbon fiber.

19. The shut-off valve of claim 1, wherein the outer flexible fabric casing comprises a plurality of layers of flexible fabric connected together.

20. The shut-off valve of claim 1, wherein the outer flexible fabric casing is coated with a flexible protective material to protect the outer flexible fabric casing from environmental conditions.

\* \* \* \* \*